United States Patent
Jen et al.

(10) Patent No.: US 9,568,739 B2
(45) Date of Patent: Feb. 14, 2017

(54) DISPLAYING METHOD OF STEREOSCOPIC DISPLAY DEVICE

(71) Applicant: WINTEK CORPORATION, Taichung (TW)

(72) Inventors: Tai-Hsiang Jen, Taipei (TW); Yan-Yu Su, Changhua County (TW); Yi-Pai Huang, Chiayi (TW); Chong-Yang Fang, Taichung (TW)

(73) Assignee: WINTEK CORPORATION, Taichung (TW)

( * ) Notice: Subject to any disclaimer, the term of this patent is extended or adjusted under 35 U.S.C. 154(b) by 143 days.

(21) Appl. No.: 14/314,049

(22) Filed: Jun. 25, 2014

(65) Prior Publication Data

US 2014/0375913 A1  Dec. 25, 2014

(30) Foreign Application Priority Data

Jun. 25, 2013 (TW) .............................. 102122561 A

(51) Int. Cl.
| | |
|---|---|
| *G02F 1/1335* | (2006.01) |
| *G02B 27/22* | (2006.01) |
| *H04N 13/04* | (2006.01) |
| *G02F 1/1343* | (2006.01) |
| *G02F 1/29* | (2006.01) |

(52) U.S. Cl.
CPC ..... *G02B 27/2214* (2013.01); *G02F 1/134309* (2013.01); *G02F 1/29* (2013.01); *H04N 13/042* (2013.01); *H04N 13/0404* (2013.01); *H04N 13/0452* (2013.01); *H04N 13/0456* (2013.01)

(58) Field of Classification Search
CPC .......................... G02B 27/22; G02B 27/2214
USPC .......................................................... 349/15
See application file for complete search history.

(56) References Cited

U.S. PATENT DOCUMENTS

| | | | |
|---|---|---|---|
| 2007/0195410 A1* | 8/2007 | Yun ..................... | G02B 27/2214 359/464 |
| 2010/0149444 A1* | 6/2010 | Hikmet ................ | G02B 27/225 349/15 |
| 2012/0120333 A1* | 5/2012 | Chen ........................ | G02B 3/14 349/33 |
| 2012/0162592 A1* | 6/2012 | Takagi ............... | G02B 27/2214 349/139 |
| 2013/0208196 A1* | 8/2013 | Kim .................. | G02F 1/134309 349/15 |

\* cited by examiner

*Primary Examiner* — Thanh-Nhan P Nguyen
(74) *Attorney, Agent, or Firm* — Winston Hsu; Scott Margo

(57) ABSTRACT

A liquid crystal lens includes a plurality of first stripe-shaped electrodes, a plurality of second stripe-shaped electrodes, and a plurality of third stripe-shaped electrodes. Each first stripe-shaped electrode is disposed between any two of the second stripe-shaped electrodes that are adjacent to each other, and each second stripe-shaped electrode and each first stripe-shaped electrode are arranged along a first direction alternately. The third stripe-shaped electrodes are arranged along a second direction sequentially and interlaced with the first stripe-shaped electrodes and the second stripe-shaped electrodes. Any two of the second stripe-shaped electrodes and two opposite sides of each third stripe-shaped electrode perpendicular to the second direction define a lens region.

7 Claims, 16 Drawing Sheets

DISPLAYING METHOD OF STEREOSCOPIC DISPLAY DEVICE

BACKGROUND OF THE INVENTION

1. Field of the Invention

The present invention relates to a liquid crystal lens, a stereoscopic display device and a displaying method thereof, and more particularly, to a liquid crystal lens and a stereoscopic display device adapted to display a frame having a two-dimensional (2D) image and a three-dimensional (3D) image simultaneously, as well as to a displaying method of stereoscopic display device displaying the two-dimensional (2D) image and the three-dimensional (3D) image simultaneously.

2. Description of the Prior Art

The displaying methods of conventional auto-stereoscopic display device for the 3D image can be divided into two different types, including using a parallax-barrier liquid crystal panel and using a liquid crystal lens. In the method of using the liquid crystal lens, the display device of the stereoscopic display device displays a left eye image and a right eye image, and the liquid crystal lens refracts the left eye image to the left eye of the user and refracts the right eye image to the right eye of the user. Therefore, the user can observe the 3D image. However, the structure of the conventional liquid crystal lens only can switch between two modes that are to present an entire liquid crystal lens and to be entirely transparent respectively, thus that, the conventional stereoscopic display device can only display the entire screen as the 2D image or the 3D image and fails to display the screen having the 2D image and the 3D image together in a part thereof. As a result, while the conventional stereoscopic display device displays text and video in the same screen, the text and the video will be displayed in 3D manner. However, the text displayed in 3D manner is easy to cause use's discomfort, due to the parallax between the left eye and the right eye. Also, the resolution of the text displayed in 3D manner is poor, in comparison with the text displayed in 2D manner, thereby making the text more blurred. Hence, there is an urgent need in the art to provide a stereoscopic display device which is capable of displaying the 2D image and the 3D image simultaneously in a screen.

SUMMARY OF THE INVENTION

It is one of the primary objectives of the present invention to provide a liquid crystal lens, a stereoscopic display device and a displaying method thereof, so as to display a frame having a two-dimensional (2D) image and a three-dimensional (3D) image simultaneously.

To achieve the purpose described above, the present invention provides a liquid crystal lens, including a first substrate, a second substrate, a liquid crystal layer, a first electrode and a second electrode pattern. The second substrate is disposed opposite to the first substrate and the liquid crystal layer is disposed between the first substrate and the second substrate. The first electrode pattern is disposed between the first substrate and the liquid crystal layer, and the first electrode pattern includes a plurality of first stripe-shaped electrodes and a plurality of second stripe-shaped electrodes, wherein each of the first stripe-shaped electrodes is disposed between any two of the second stripe-shaped electrodes that are adjacent to each other, and each of the second stripe-shaped electrodes and each of the first stripe-shaped electrodes are arranged along a first direction alternately. The second electrode pattern is disposed between the second substrate and the liquid crystal layer, and the second electrode pattern includes a plurality of third stripe-shaped electrodes sequentially arranged along a second direction different from the first direction, and interlaced with the first stripe-shaped electrodes and the second stripe-shaped electrodes, wherein any two of the second stripe-shaped electrodes that are adjacent to each other and two opposite sides of each of the third stripe-shaped electrodes define a lens region.

To achieve the purpose described above, the present invention also provides a stereoscopic display device, including a display device and a liquid crystal lens. The display device includes a display surface, and the display device includes a plurality of pixels. The liquid crystal lens is disposed on the display surface, and the liquid crystal lens includes a first substrate, a second substrate, a liquid crystal layer, a first electrode pattern and a second electrode pattern. The second substrate is disposed opposite to the first substrate and the liquid crystal layer is disposed between the first substrate and the second substrate. The first electrode pattern is disposed between the first substrate and the liquid crystal layer, and the first electrode pattern includes a plurality of first stripe-shaped electrodes and a plurality of second stripe-shaped electrodes, wherein each of the first stripe-shaped electrodes is disposed between any two of the second stripe-shaped electrodes that are adjacent to each other, and each of the second stripe-shaped electrodes and each of the first stripe-shaped electrodes are arranged along a first direction alternately. The second electrode pattern is disposed between the second substrate and the liquid crystal layer, and the second electrode pattern includes a plurality of third stripe-shaped electrodes sequentially arranged along a second direction different from the first direction, and interlaced with the first stripe-shaped electrodes and the second stripe-shaped electrodes, wherein any two of the second stripe-shaped electrodes that are adjacent to each other and two opposite sides of each of the third stripe-shaped electrodes define a lens region.

To achieve the purpose described above, the present invention further provides a displaying method of a stereoscopic display device. Firstly, the stereoscopic display device is provided and which includes a display device and a liquid crystal lens. The display device includes a display surface, and the display device includes a plurality of pixels. The liquid crystal lens is disposed on the display surface and the liquid crystal lens includes a first substrate, a second substrate, a liquid crystal layer, a first electrode pattern and a second electrode pattern. The second substrate is disposed opposite to the first substrate and the liquid crystal layer is disposed between the first substrate and the second substrate. The first electrode pattern is disposed between the first substrate and the liquid crystal layer, and the first electrode pattern includes a plurality of first stripe-shaped electrodes and a plurality of second stripe-shaped electrodes, wherein each of the first stripe-shaped electrodes is disposed between any two of the second stripe-shaped electrodes that are adjacent to each other, and each of the second stripe-shaped electrodes and each of the first stripe-shaped electrodes are arranged along a first direction alternately. The second electrode pattern is disposed between the second substrate and the liquid crystal layer, and the second electrode pattern includes a plurality of third stripe-shaped electrodes sequentially arranged along a second direction different from the first direction, and interlaced with the first stripe-shaped electrodes and the second stripe-shaped electrodes, wherein any two of the second stripe-shaped electrodes that are adjacent to each other and two opposite sides of each of the third stripe-shaped electrodes define a lens region. Then, a frame is displayed on the display surface of the display device, and the frame includes a 2D image and a 3D image. Next, a plurality of first voltages is applied to the second stripe-shaped electrodes, and the first stripe-shaped electrodes corresponding to the 2D image, respectively. As following, a plurality of second voltages is provided to the first stripe-shaped electrodes corresponding to the 3D image, and the third stripe-shaped electrodes corresponding to the 3D image, respectively. Then, a plurality of third voltages is applied to the third stripe-shaped electrodes corresponding to the 2D image, wherein each of the second voltages is between each of the first voltages and each of the third voltages.

To achieve the purpose described above, the present invention further provides a liquid crystal lens, including a first substrate, a second substrate, a liquid crystal layer, an electrode pattern and a plane electrode. The second substrate is disposed opposite to the first substrate, and the liquid crystal layer is disposed between the first substrate and the second substrate. The electrode pattern is disposed between the first substrate and the liquid crystal layer. The electrode pattern includes a plurality of first stripe-shaped electrodes and a plurality of second stripe-shaped electrodes, and the first stripe-shaped electrodes and the second stripe-shaped electrodes are arranged in a matrix arrangement, wherein each column of the second stripe-shaped electrodes and each column of the first stripe-shaped electrodes are arranged along a first direction alternately. The plane electrode is disposed between the second substrate and the liquid crystal layer, and the plane electrode covers the electrode pattern in a projection direction perpendicular to the first substrate, wherein any two of the second stripe-shaped electrodes that are adjacent to each other define a lens region.

To achieve the purpose described above, the present invention further provides a stereoscopic display device, including a display device and a liquid crystal lens. The display device includes a display surface, and the display device includes a plurality of pixels. The liquid crystal lens is disposed on the display surface, and the liquid crystal lens includes a first substrate, a second substrate, a liquid crystal layer, an electrode pattern and a plane electrode. The second substrate is disposed opposite to the first substrate, and the liquid crystal layer is disposed between the first substrate and the second substrate. The electrode pattern is disposed between the first substrate and the liquid crystal layer. The electrode pattern includes a plurality of first stripe-shaped electrodes and a plurality of second stripe-shaped electrodes, and the first stripe-shaped electrodes and the second stripe-shaped electrodes are arranged in a matrix arrangement, wherein each column of the second stripe-shaped electrodes and each column of the first stripe-shaped electrodes are arranged along a first direction alternately. The plane electrode is disposed between the second substrate and the liquid crystal layer, and the plane electrode covers the electrode pattern in a projection direction perpendicular to the first substrate, wherein any two of the second stripe-shaped electrodes that are adjacent to each other define a lens region.

To achieve the purpose described above, the present invention further provides a displaying method of a stereoscopic display device. Firstly, the stereoscopic display device is provided and which includes a display device and a liquid crystal lens. The display device includes a display surface, and the display device includes a plurality of pixels. The liquid crystal lens is disposed on the display surface and the liquid crystal lens includes a first substrate, a second substrate, a liquid crystal layer, an electrode pattern and a plane electrode. The second substrate is disposed opposite to the first substrate, and the liquid crystal layer is disposed between the first substrate and the second substrate. The electrode pattern is disposed between the first substrate and the liquid crystal layer. The electrode pattern includes a plurality of first stripe-shaped electrodes and a plurality of second stripe-shaped electrodes, and the first stripe-shaped electrodes and the second stripe-shaped electrodes are arranged in a matrix arrangement, wherein each column of the second stripe-shaped electrodes and each column of the first stripe-shaped electrodes are arranged along a first direction alternately. The plane electrode is disposed between the second substrate and the liquid crystal layer, and the plane electrode covers the electrode pattern in a projection direction perpendicular to the first substrate, wherein any two of the second stripe-shaped electrodes that are adjacent to each other define a lens region. Then, a frame is displayed on the display surface of the display device, and the frame includes a 2D image and a 3D image. A plurality of first voltages is applied to the second stripe-shaped electrodes, and the first stripe-shaped electrodes corresponding to the 2D image, respectively. A plurality of second voltages is applied to the first stripe-shaped electrodes corresponding to the 3D image, and the plane electrode.

Since the third stripe-shaped electrodes are interlaced with the first stripe-shaped electrodes and the second stripe-shaped electrodes in the liquid crystal lens of the present invention, the liquid crystal lens in a part of the lens regions is able to show a transparent state and the liquid crystal lens in another part of the lens regions to show a lens state simultaneously. Furthermore, the liquid crystal lens using the first stripe-shaped electrodes and the second stripe-shaped electrodes in independent control of the lens regions corresponding to the 3D image to show the lens state, and the liquid crystal lens in the lens regions corresponding to the 2D image to show the transparent state. Therefore, the stereoscopic display device of the present invention can display the 2D images and the 3D images simultaneously.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
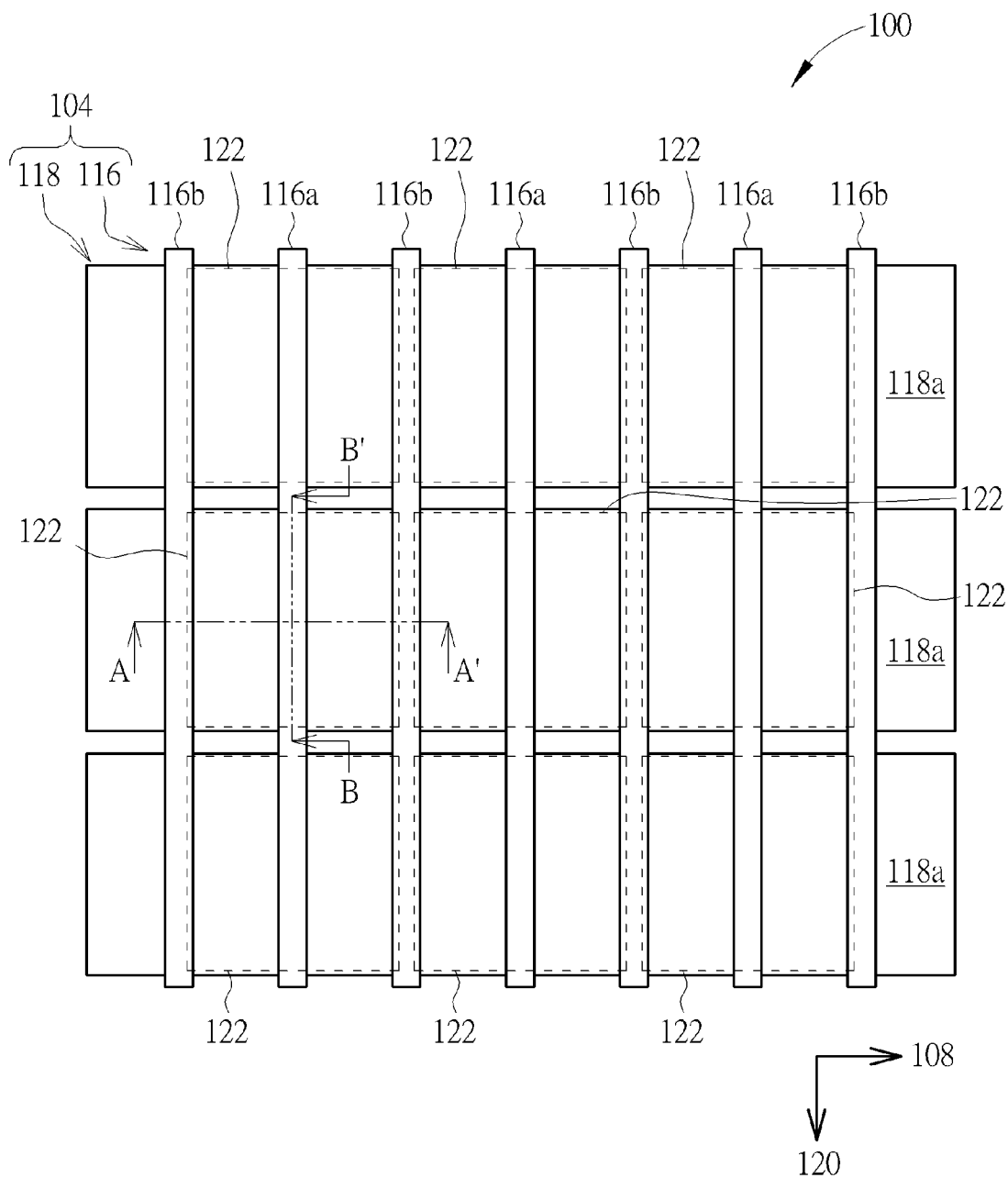
FIG. 1 is a schematic top view illustrating a stereoscopic display device according to a first embodiment of the present invention.
Figure 2:
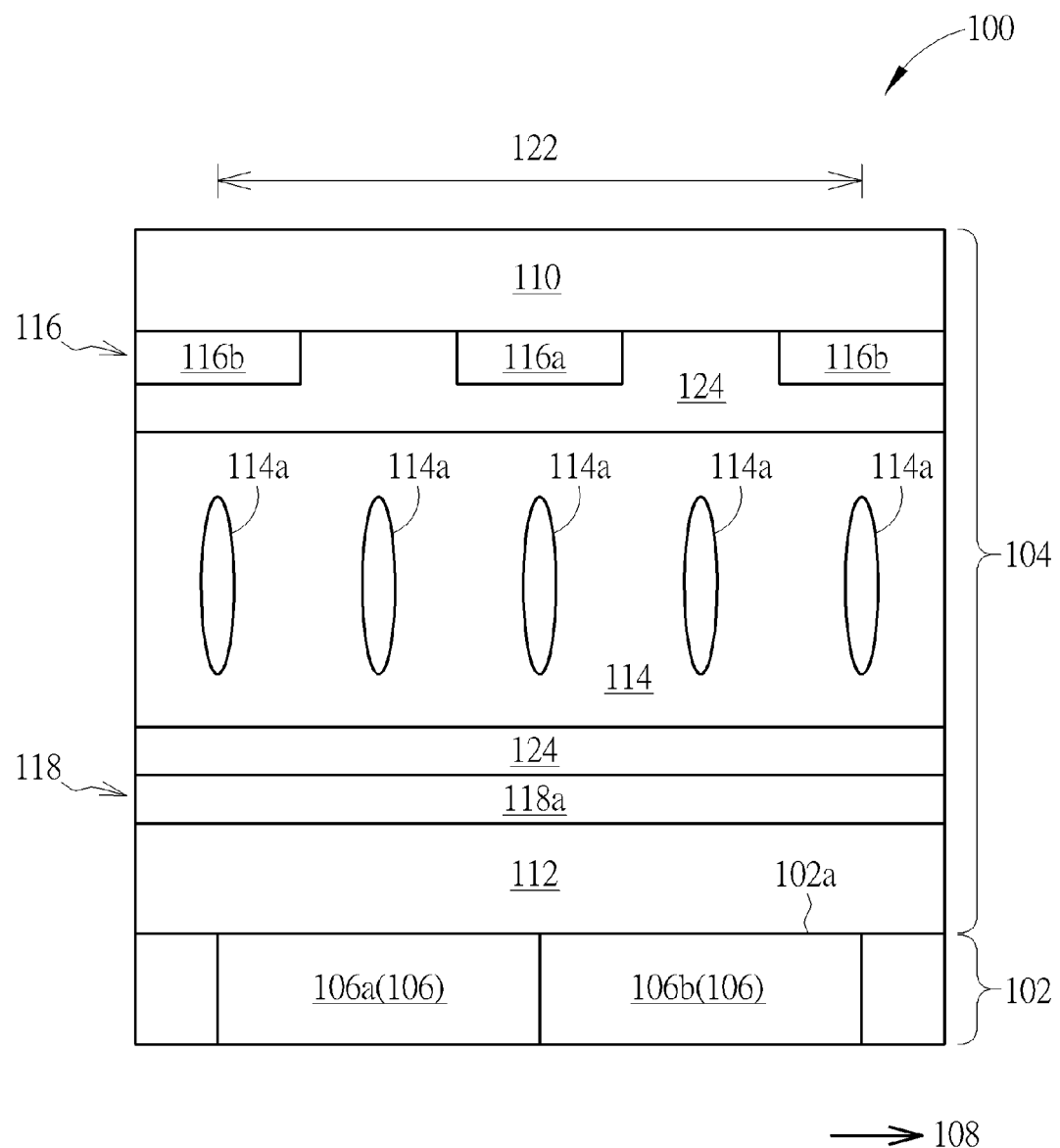
FIG. 2 is a schematic cross-sectional view taken along the cross line A-A' in FIG. 1.
Figure 3:
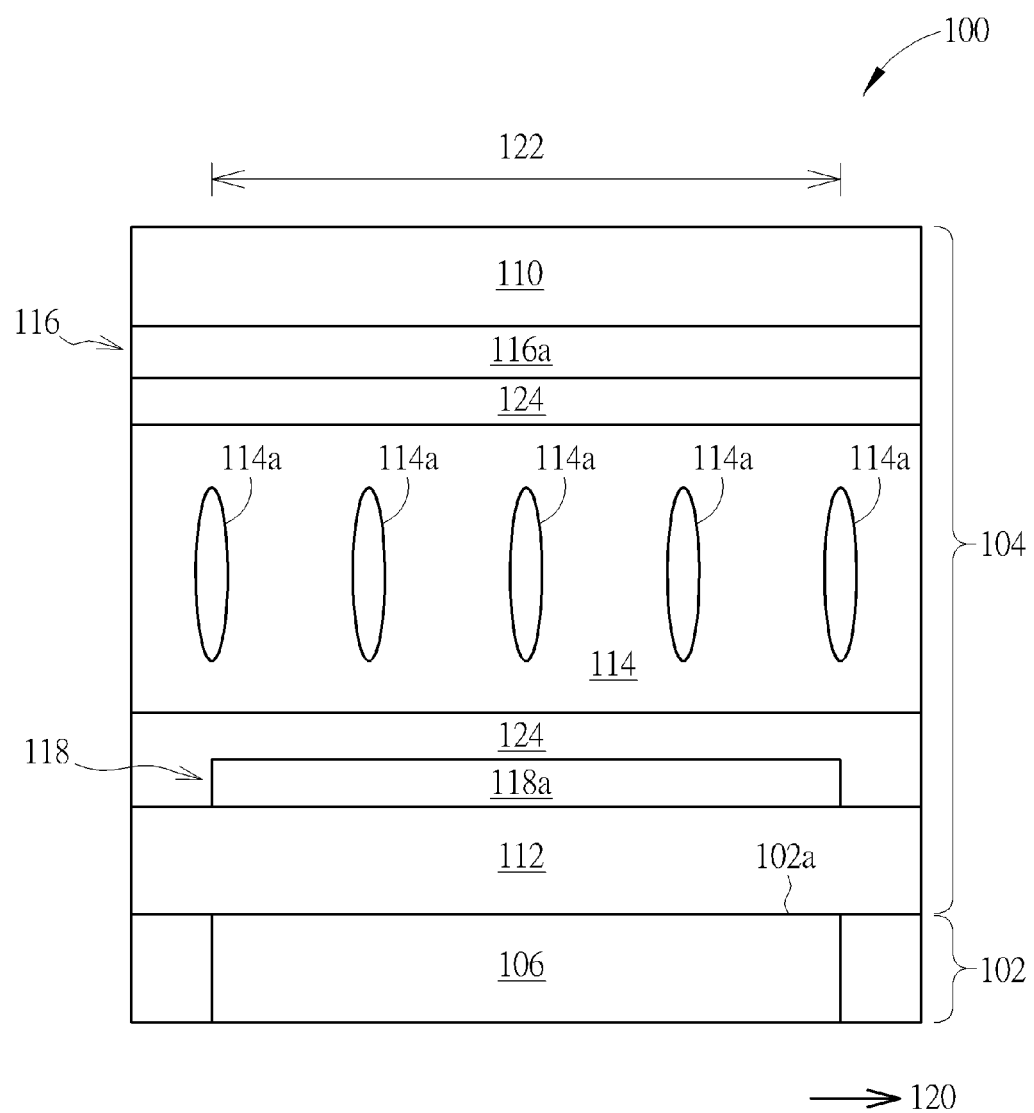
FIG. 3 is a schematic cross-sectional view taken along the cross line B-B' in FIG. 1.

Referring to FIGS. 1-3, FIG. 1 is a schematic top view illustrating a stereoscopic display device according to a first embodiment of the present invention, FIG. 2 is a schematic cross-sectional view taken along a cross line A-A' in FIG. 1, and FIG. 3 is a schematic cross-sectional view taken along a cross line B-B' in FIG. 1. As shown in FIGS. 1-3, a stereoscopic display device 100 includes a display device 102 and a liquid lens 104. The display device 102 has a display surface 102a, and the display device 102 includes a plurality of pixels 106, adapted to display a frame from the display surface 102a. The frame displayed by the pixels 106 may include a two-dimensional (2D) image, a three-dimensional (3D) image or a hybrid of a 2D image and a 3D image. In this embodiment, the pixels 106 are arranged in a matrix arrangement, but not limited thereto. While the frame includes the 3D image, the pixels 106 may include a plurality of first viewing angle pixels 106a and a plurality of second viewing angle pixels 106b, and the first viewing angle pixels 106a are used to display a first viewing angle frame and the second viewing angle pixels 106b are used to display a second viewing angle frame. Furthermore, each of the first viewing angle pixels 106a and each of the second viewing angle pixels 106b are arranged along a first direction 108 alternately in each row of the pixels 106. Namely, each column of the first viewing angle pixels 106a and each column of the second viewing angle pixels 106b are arranged along the first direction 108 alternately. For example, the first viewing angle pixels 106a can be left eye pixel, and the second viewing angle pixels 106b can be right eye pixel. Therefore, each of the first viewing angle pixels 106a and each of the second viewing angle pixels 106b that are adjacent to each other can compose a pixel of the 3D image, but not limited thereto. In this embodiment, the display device 102 may include for example a liquid crystal display device or an organic light emitting diode, but not limited thereto. In addition, the liquid crystal lens 104 is disposed on the display surface 102a of the display device 102, for presenting a lens state or a transparent state. While the stereoscopic display device 100 displays the 3D image, the liquid crystal lens 104 is stayed in the lens state. Therefore, the frame having the first viewing angle frame and the second viewing angle frame can be distinguished while pass through the liquid crystal lens 104, and the first viewing angle frame and the second viewing angle frame can leave the liquid crystal lens 104 with different viewing angles, so as to perform the 3D image.

Precisely speaking, the liquid crystal lens 104 includes a first substrate 110, a second substrate 112, a liquid crystal layer 114, a first electrode pattern 116 and a second electrode pattern 118. The first substrate 110 is disposed opposite to the second substrate 112, and the liquid crystal layer 114 is disposed between the first substrate 110 and the second substrate 112. The first electrode pattern 116 is disposed between the first substrate 110 and the liquid crystal layer 114, and the second electrode pattern 118 is disposed between the second substrate 112 and the liquid crystal layer 114. In this embodiment, the second substrate 112 is disposed between the display device 102 and the first substrate 110, and the second electrode pattern 118 is disposed between the first electrode pattern 116 and the display device 102, but the present invention is not limited thereto. Also, the first substrate 110 and the second substrate 112 can be a transparent substrate, such as glass substrate, plastic substrate or quartz substrate, but not limited thereto. In addition, the liquid crystal layer 114 may include a plurality of liquid crystal molecules 114a, such as twisted nematic liquid crystal molecules, but not limited thereto.

Furthermore, the first electrode pattern 116 of this embodiment includes a plurality of first stripe-shaped electrodes 116a and a plurality of second stripe-shaped electrodes 116b that are parallel to the first stripe-shaped electrodes 116a. Wherein, each of the first stripe-shaped electrodes 116a and each of the second stripe-shaped electrodes 116b extend along a second direction 120 which is different from the first direction 108 and disposed corresponding to each column of the pixels 106, and the lengths of each of the first stripe-shaped electrodes 116a and each of the second stripe-shaped electrodes 116b extending along the second direction 120 are approximately the same as the length of each column of the pixels 106. Furthermore, each of the first stripe-shaped electrodes 116a is disposed between any two of the second stripe-shaped electrodes 116b that are adjacent to each other, thereby each of the second stripe-shaped electrodes 116b and each of the first stripe-shaped electrodes 116a being arranged along the first direction 108 alternately. Moreover, the second electrode pattern 118 includes a plurality of third stripe-shaped electrodes 118a sequentially arranged along the second direction 120, and each of the third stripe-shaped electrodes 118a extends along the first direction 108 and is disposed corresponding to each row of the pixels 106. Thus, the third stripe-shaped electrodes 118a are interlaced with the first stripe-shaped electrodes 116a and the second stripe-shaped electrodes 116b. Furthermore, to avoid the moire effect of the stereoscopic display device 100, at least one appearance of the plurality of first stripe-shaped electrodes 116a and the plurality of second stripe-shaped electrodes 116b and the third stripe-shaped electrodes 118a is wave-like or sawtooth shape, but not limited thereto. In other way, adjust the included angle between the plurality of first stripe-shaped electrodes 116a and the plurality of second stripe-shaped electrodes 116b to plus or minus 20 degrees to avoid the moire effect of the stereoscopic display device 100. In this embodiment, any two of the second stripe-shaped electrodes 116b that are adjacent to each other and two opposite sides of each of the third stripe-shaped electrodes 116b perpendicular to the second direction 120 define a lens region 112, and the liquid crystal lens 104 in each lens region 112 can produce a single lens effect in the lens state. Also, each lens region 112 is disposed corresponding to each of the first viewing angle pixels 106a and each of the second viewing angle pixels 106b that are adjacent to each other, namely, corresponding to two pixels 106 that are adjacent to each other. Therefore, the light generated from each of the first viewing angle pixels 106a and the light generated from each of the second viewing angle pixels 106b can be refracted respectively while they pass through the lens of each lens region 122, and left the lens with different viewing angles. Preferably, a distance between each of the first stripe-shaped electrodes 116a and each of the second stripe-shaped electrodes 116b can be substantially identical, but that may have tolerances in the fabrication process. So that the lens of each lens region 122 can be symmetrical to each of the first stripe-shaped electrodes 116a. On the other hand, the liquid crystal lens 104 of this embodiment can be optionally further includes two alignment films 124 disposed between the first electrode pattern 116 and the liquid crystal layer 114, and disposed between the second electrode pattern 118 and the liquid crystal layer 114, respectively, thereby aligning the liquid crystal molecules 114a of the liquid crystal layer 114 in a predetermined arrangement direction and a predetermined tilt angle while no electric field is applied to the liquid crystal molecules 114a.

Please note that, since the third stripe-shaped electrodes 118a of the liquid crystal lens 104 in this embodiment are interlaced with the first stripe-shaped electrodes 116a and the second stripe-shaped electrodes 116b, and are disposed corresponding to each row of the pixels 106, the liquid crystal lens 104 in a portion of the lens regions can be in the transparent state and the liquid crystal lens 104 in another portion of the lens region can be in the lens state simultaneously. Accordingly, the frame including the 2D image and the 3D image displayed by the display device 102 can be displayed through the liquid crystal lens 104, so that the stereoscopic display device 100 can display the 2D image and the 3D image simultaneously. Also, a pixel of the 3D image should be shown by each of the first viewing angle pixels 106a and each of the second viewing angle pixels 106b, but a pixel of the 2D image can be shown by only one pixel 106. Accordingly, the stereoscopic display device 100 of this embodiment can display a portion of the frame with the 2D image through displaying the 2D image and the 3D image simultaneously, thereby raising the resolution of the portion of the frame.

Figure 4:
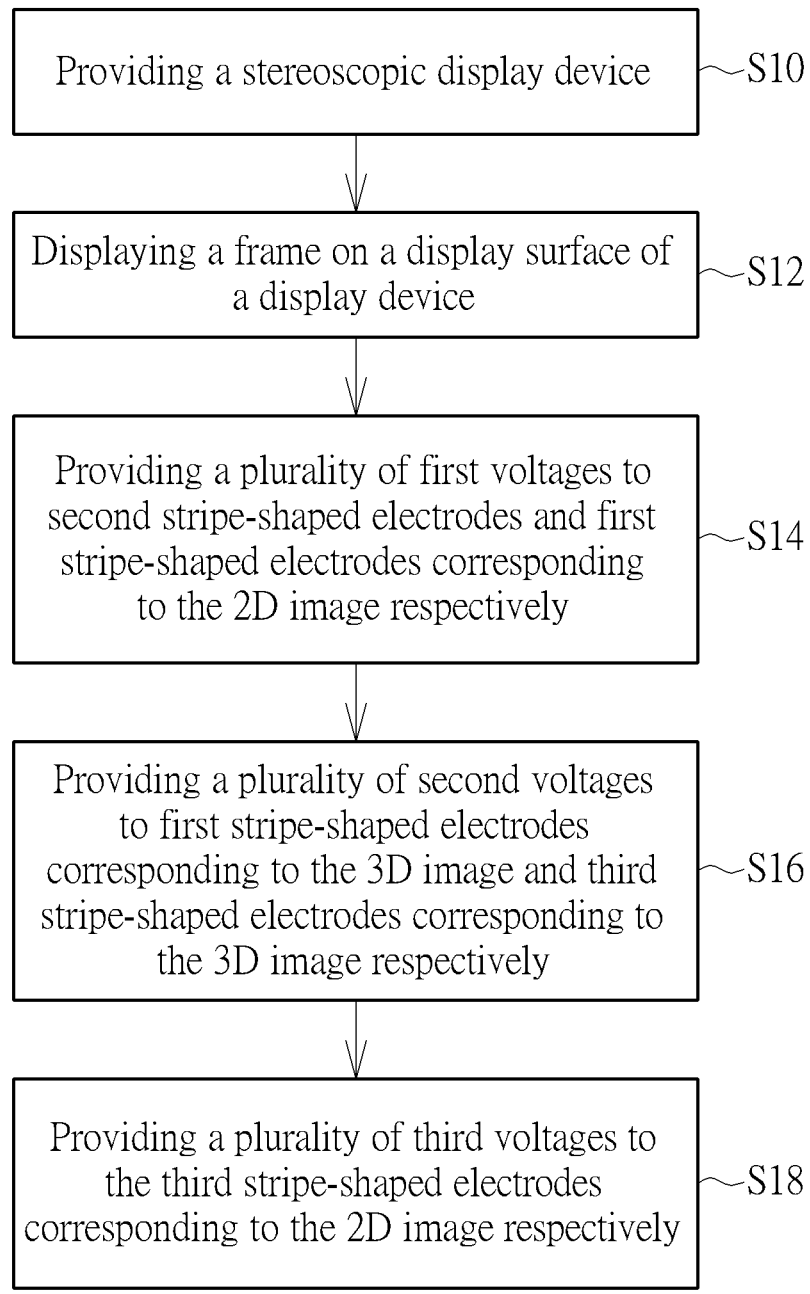
FIG. 4 is a flowchart illustrating a displaying method of the stereoscopic display device according to the first embodiment of the present invention for displaying a frame having a 2D image and a 3D image simultaneously.
Figure 5:
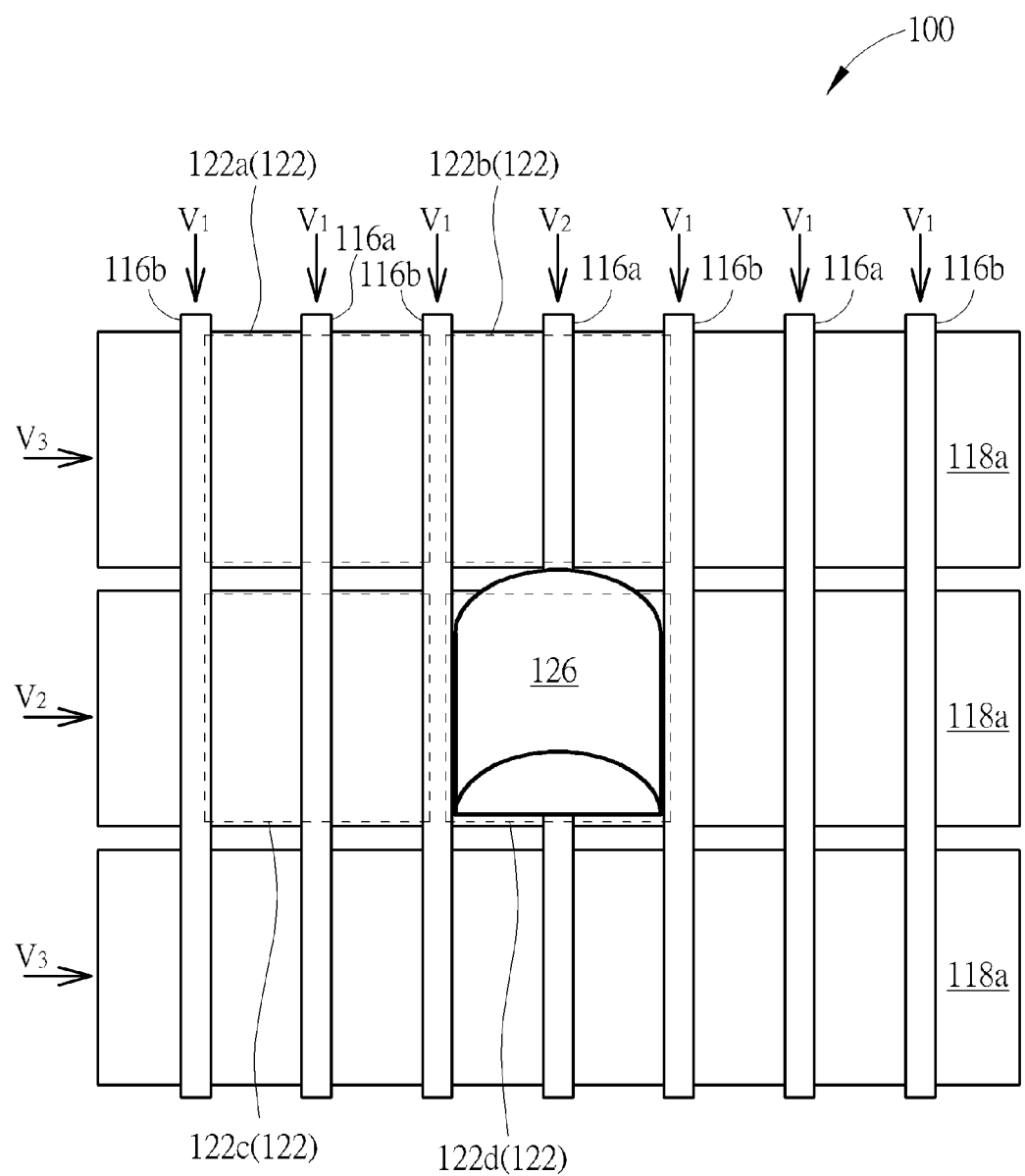
FIG. 5 is a diagram illustrating a liquid crystal lens according to the first embodiment of the present invention while the stereoscopic display device displaying the frame having the 2D image and the 3D image simultaneously.
Figure 6:
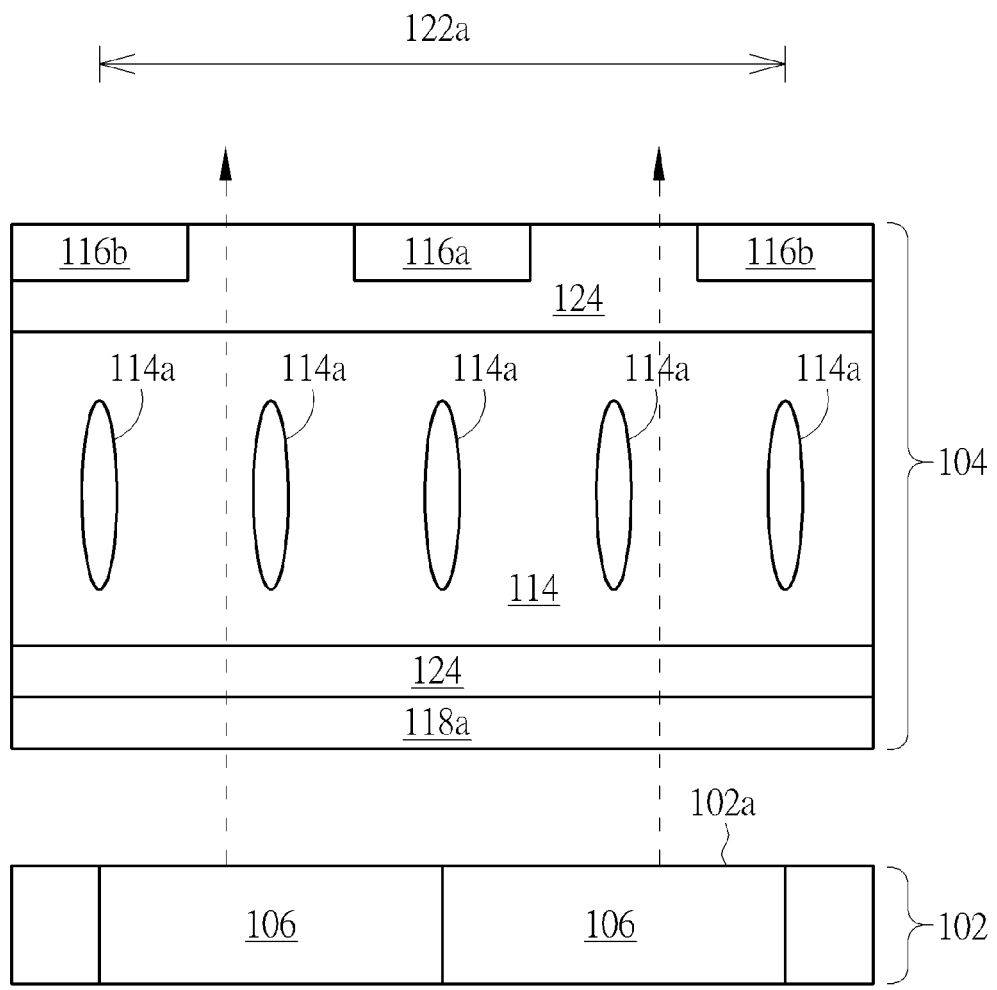
FIG. 6, FIG. 7, FIG. 8, and FIG. 9 are cross-sectional schematic views illustrating the liquid crystal lens of different lens regions.
Figure 7:
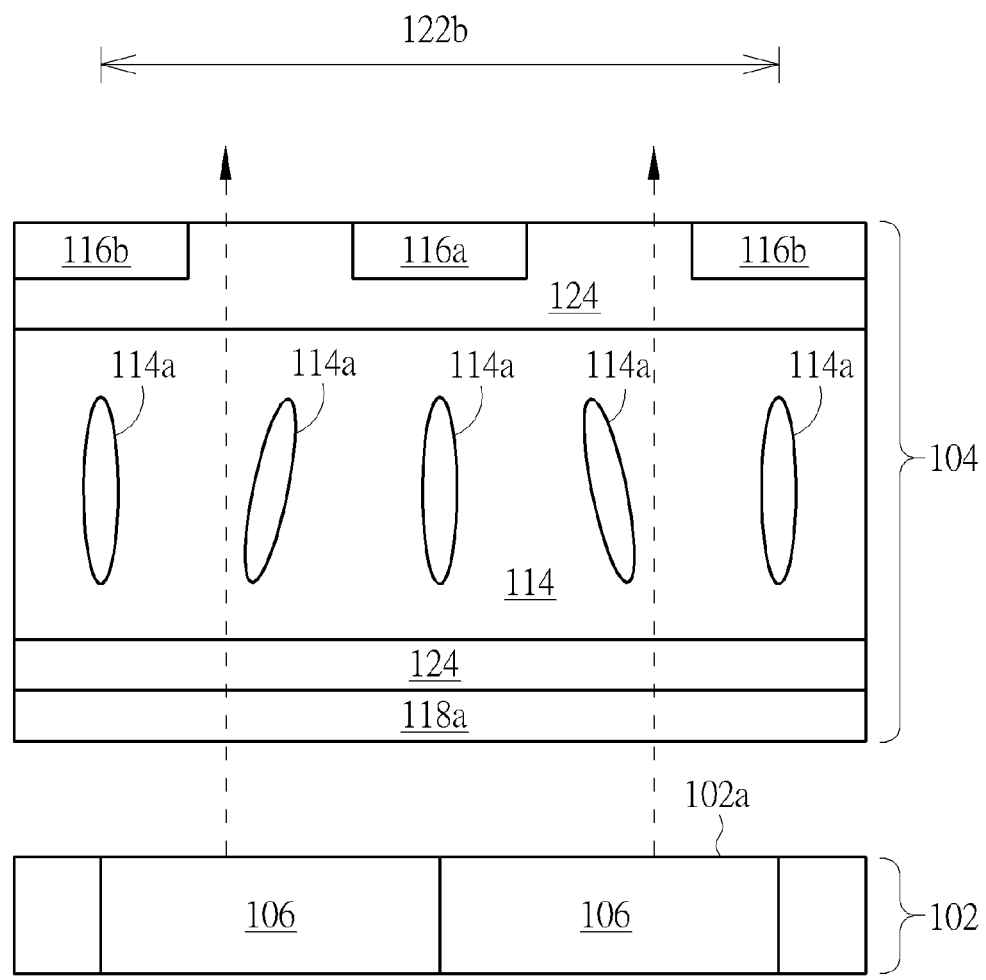
Figure 8:
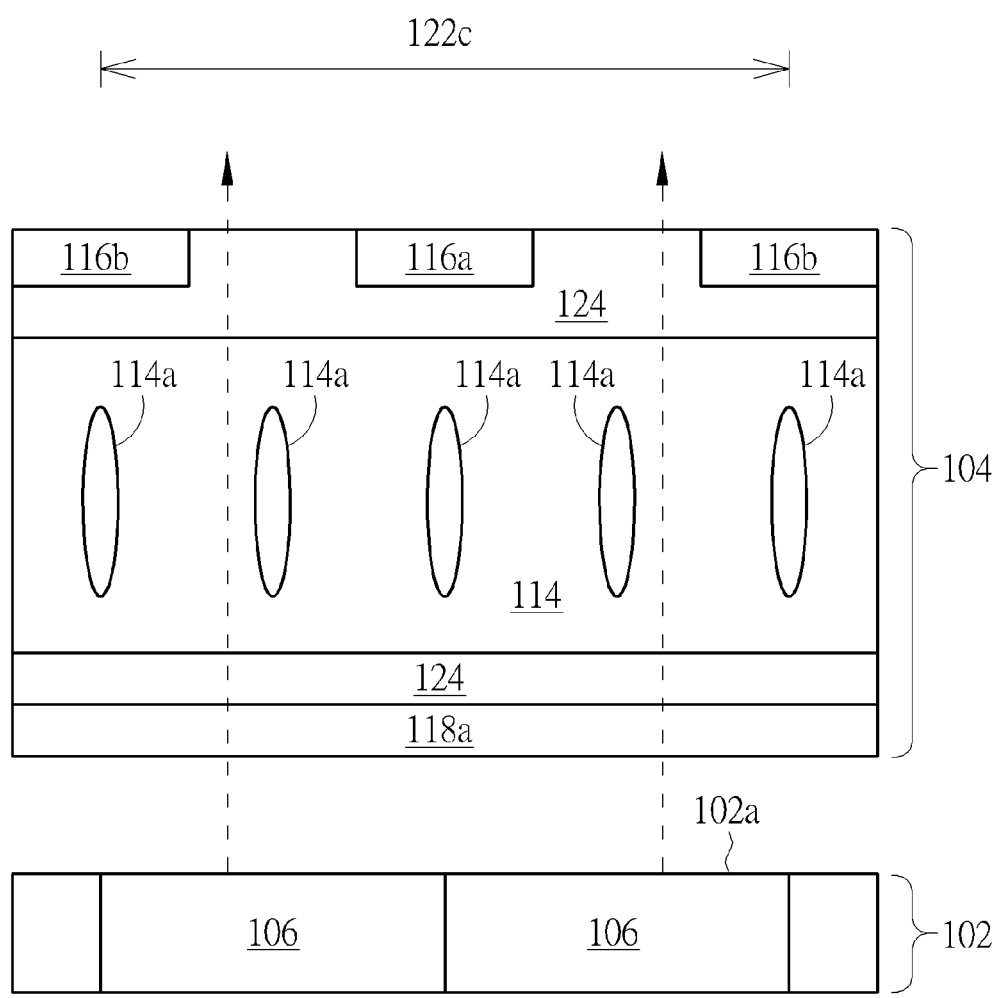
Figure 9:
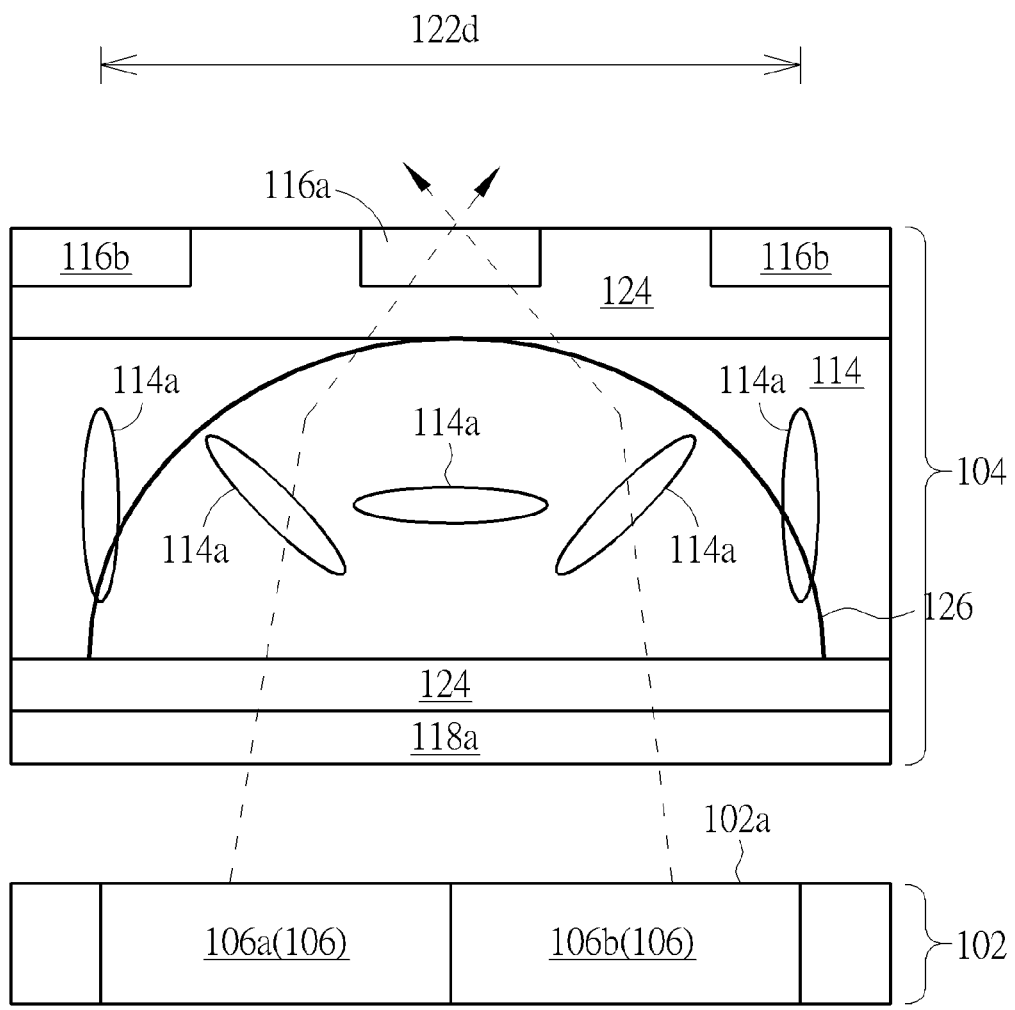

In following description, a displaying method of the stereoscopic display device 100 of this embodiment for displaying a frame having the 2D image and 3D image simultaneously will be detailed. Please refer to FIGS. 4-9. FIG. 4 is a flow chart illustrating a display method of the stereoscopic display device according to the first embodiment of the present invention for displaying a frame having the 2D image and the 3D image simultaneously, FIG. 5 is a diagram illustrating a liquid crystal lens according to the first embodiment of the present invention while the stereoscopic display device displaying the frame having 2D image and the 3D image simultaneously, and FIGS. 6-9 are schematic cross-sectional views illustrating the liquid crystal lens in different lens regions shown in FIG. 5. As shown in FIG. 4, the displaying method of the stereoscopic display device 100 for displaying the frame having the 2D image and the 3D image simultaneously, in this embodiment may include:

Step S10: providing the stereoscopic display device 100;

Step S12: displaying a frame on the display surface 102a of the display device 102, and the frame including a 2D image and a 3D image;

Step S14: providing a plurality of first voltages $V_1$ to the second stripe-shaped electrodes 116b and the first stripe-shaped electrodes 116a corresponding to the 2D image respectively;

Step S16: providing a plurality of second voltages $V_2$ to the first stripe-shaped electrodes 116a corresponding to the 3D image and the third stripe-shaped electrodes 118a corresponding to the 3D image respectively; and Step S18: providing a plurality of third voltages $V_3$ to the third stripe-shaped electrodes 118a corresponding to the 2D image respectively, wherein each of the second voltages $V_2$ is between each of the first voltages $V_1$ and each of the third voltages $V_3$.

In this embodiment, the 2D image in step S12 can be for example text, and the 3D image in step S12 can be video or picture, but not limited thereto. In addition, in step S14 to step S16, there is a first voltage difference between each of the first voltages $V_1$ and each of the second voltages $V_2$, and the first voltage difference can be greater than 0 volts and less than 20 volts. There is a second voltage difference between each of the second voltages $V_2$ and each of the third voltages $V_3$, and the second voltage difference can be greater than 0 volts and less than 20 volts. Since each of the second voltages $V_2$ is between each of the first voltages $V_1$ and each of the third voltages $V_3$, a third voltage difference between each of the first voltages $V_1$ and each of the third voltages $V_3$ can be greater than 0 volts and less than 40 volts. Accordingly, each first voltage difference, each second voltage difference, and each third voltage difference can be used to rotate the long axis of the liquid crystal molecules 114a to be approximately perpendicular to the first substrate 110. Each of the first voltages $V_1$ of this embodiment can be greater than each of the second voltages $V_2$, and each of the second voltages $V_2$ can be greater than each of the third voltages $V_3$, but not limited thereto. For example, as shown in FIGS. 5-9, the first voltages $V_1$ are provided to the second stripe-shaped electrodes 116b crossed through the lens region 122a, 122b, 122c, 122d and the first stripe-shaped electrodes 116a crossed through the lens region 122a, 122c respectively, such as 2 volts of positive voltage, and the third voltages $V_3$ are provided to the third stripe-shaped electrodes 118a crossed through the lens region 122a, 122b respectively, such as −3 volts of negative voltage. Therefore, the liquid crystal molecules 114a in the lens region 122a will be driven by the third voltage difference, thereby rotating the long axis of each liquid crystal molecule 114a to be approximately perpendicular to the first substrate 110.

Furthermore, the second voltages $V_2$ are provided to the first stripe-shaped electrodes 116a crossed through the lens region 122b, 122d and the third stripe-shaped electrodes 118a crossed through the lens region 122c, 122d respectively, such as 0 volts. Thus, the liquid crystal molecules 114a between the second stripe-shaped electrodes 116b and the third stripe-shaped electrodes 118a in the lens region 122b will be driven by the third voltage difference, thereby rotating the long axis of each liquid crystal molecule 114a to be approximately perpendicular to the first substrate 110, and the liquid crystal molecules 114a between the first stripe-shaped electrodes 116a and the third stripe-shaped electrodes 118a in the lens region 122b will be driven by the third voltage difference thereby rotating the long axis of each liquid crystal molecules 114a to be also approximately perpendicular to the first substrate 110. In this embodiment, 0 volts can be considered as the first stripe-shaped electrodes 116a corresponding to the 3D image and the third stripe-shaped electrodes 118a corresponding to the 3D image being electrically connected to a ground terminal, but not limited thereto. Also, the first voltages $V_1$ of this embodiment are identical to one another, the second voltages $V_2$ of this embodiment are identical to one another, and the third voltages $V_3$ of this embodiment are identical to one another, but the present invention is not limited thereto. In other embodiments of the present invention, at least two of the first voltages $V_1$ can be different. Similarly, at least two of the second voltages $V_2$ can also be different, or at least two of the third voltages $V_3$ can also be different.

Furthermore, the liquid crystal molecules 114a in the lens region 122c will be driven by the second voltage difference, so that the long axis of the liquid crystal molecules 114a can be rotated to be approximately perpendicular to the first substrate 110. Accordingly, the liquid crystal lens 104 in the lens regions 122a, 122b, 122c can be in the transparent state, and the light generated from the pixels 106 corresponding to the lens regions 122a, 122b, 122c can directly pass through the liquid crystal lens 104 of the lens regions 122a, 122b, 122c, to perform the 2D image.

Additionally, the liquid crystal molecules 114a between the second stripe-shaped electrodes 116b and the third stripe-shaped electrodes 118a in the lens region 122d will be driven by the second voltage difference, thereby rotating the long axis of the liquid crystal molecules 114a to be approximately perpendicular to the first substrate 110. However, since there is no voltage difference between the first stripe-shaped electrode 116a and the third stripe-shaped electrode 118a in the lens region 122d, the liquid crystal molecules 114a between the first stripe-shaped electrode 116a and the third stripe-shaped electrode 118a will not be rotated and the long axis of each liquid crystal molecules 114a in the lens region 122d remains parallel to the first substrate 110. Also, since the second voltage difference is still present between the second stripe-shaped electrode 116b and the third stripe-shaped electrode 118a in the lens region 122d, the liquid crystal molecules 114a between the second stripe-shaped electrode 116b and the third stripe-shaped electrode 118a in the lens region 122d will be rotated by the second voltage difference, thereby rotating the long axes of the liquid crystal molecules 114a to be perpendicular to the first substrate 110. Since the first voltage difference is still present between the first stripe-shaped electrode 116a and the second stripe-shaped electrodes 116b, the liquid crystal molecules 114a between the first stripe-shaped electrode 116a and the second stripe-shaped electrode 116b will be rotated by an electric field gradient between the second stripe-shaped electrodes 116b and the first stripe-shaped electrode 116a, and an electric field gradient between the second stripe-shaped electrodes 116b and the third stripe-shaped electrodes 118a. As a result, the liquid crystal lens 104 in the lens region 122d can form a lens 126, thereby presenting the lens state. Therefore, the light generated from the first viewing angle pixels 106a and the second viewing angle pixels 106b which are corresponding to the lens region 122d can be refracted respectively while it pass through the lens 126, and leave the lens 126 with the first viewing angle and the second viewing angle respectively, so as to perform the 3D image. Each of the first voltages in the present invention is but not limited to be greater than each of the second voltages, and each of the second voltages is but not limited to be greater than each of the third voltages. In other embodiments of the present invention, each of the first voltages can be less than each of the second voltages, and each of the second voltages can be less than each of the third voltages. For example, each of the first voltages can be a negative voltage, such as −3 volts; each of the second voltages is 0 volts; and each of the third voltages can be a positive voltage, such as 2 volts. Otherwise, each of the second voltages is not 0 volts and is a positive voltage or a negative voltage.

Through the aforementioned description, it is known that the stereoscopic display device 100 of this embodiment is able to display the 3D image in the lens region 122d corresponding to the 3D image, and to display 2D image in the lens regions 122a, 122b, 122c corresponding to the 2D image through the aforementioned display method.

The stereoscopic display device of the present invention is not limited to the aforementioned embodiments. The following description will detail the other embodiments or variant embodiments of the present invention. To simplify the description, the following description will detail the dissimilarities among those embodiments and the variant embodiments and the identical features will not be redundantly described. In order to compare the differences between the embodiments easily, the identical components in each of the following embodiments are marked with identical symbols.

Figure 10:
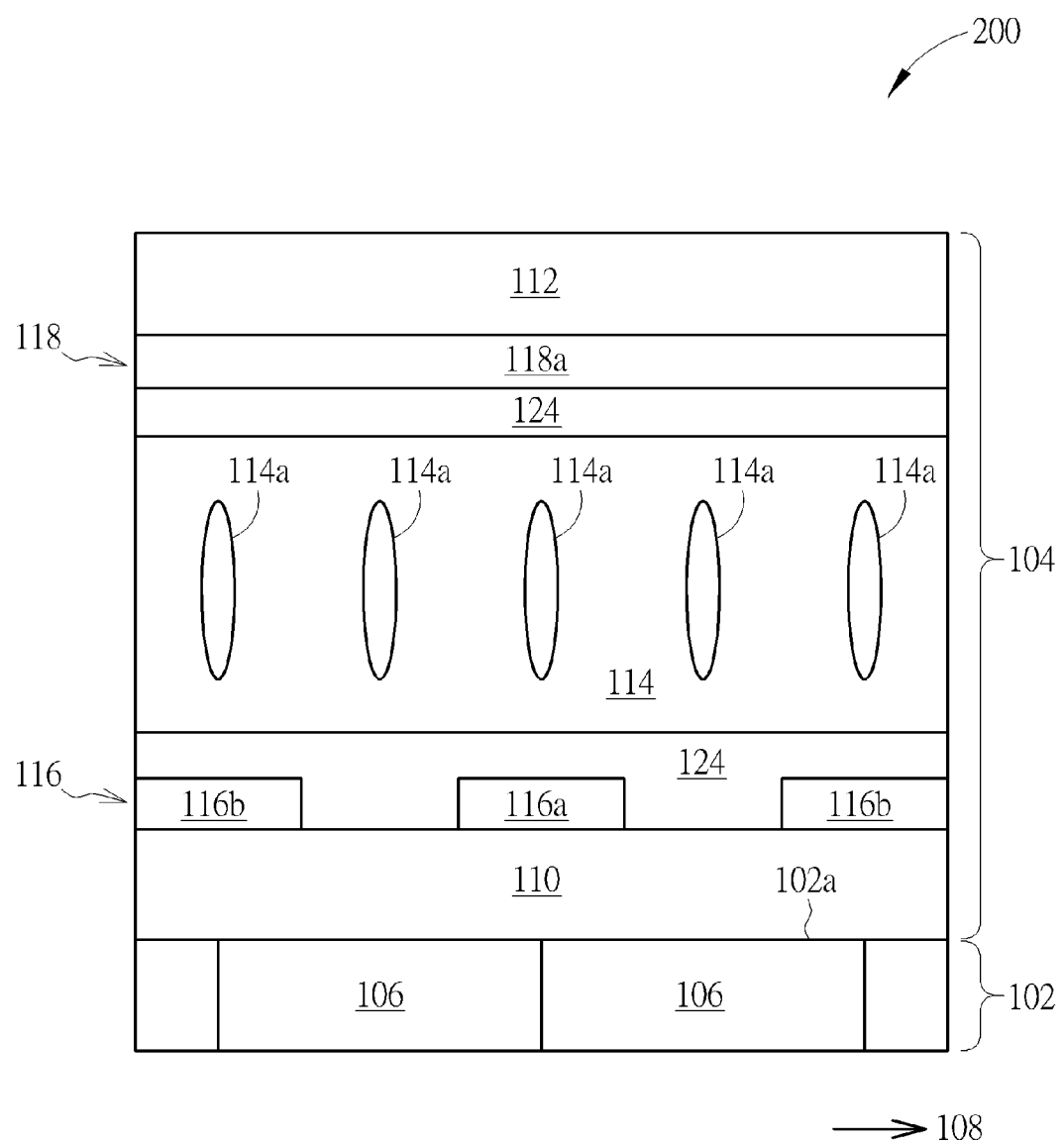
FIG. 10 is a cross-sectional schematic view illustrating a stereoscopic display device according to a second embodiment of the present invention.

Referring to FIG. 10, FIG. 10 is a schematic cross-sectional view illustrating a stereoscopic display device according to a second embodiment of the present invention. As shown in FIG. 10, the second embodiment of the present invention provides a stereoscopic display device 200. In comparison with the stereoscopic display device 100 of the aforementioned first embodiment, the first substrate 100 of this embodiment is disposed between the display device 102 and the second substrate 112, so that the first electrode pattern 116 is disposed between the second electrode pattern 118 and the display device 102. Also, the stereoscopic display device 200 of this embodiment can also use the aforementioned displaying method to display the frame having the 2D image and the 3D image simultaneously.

Figure 11:
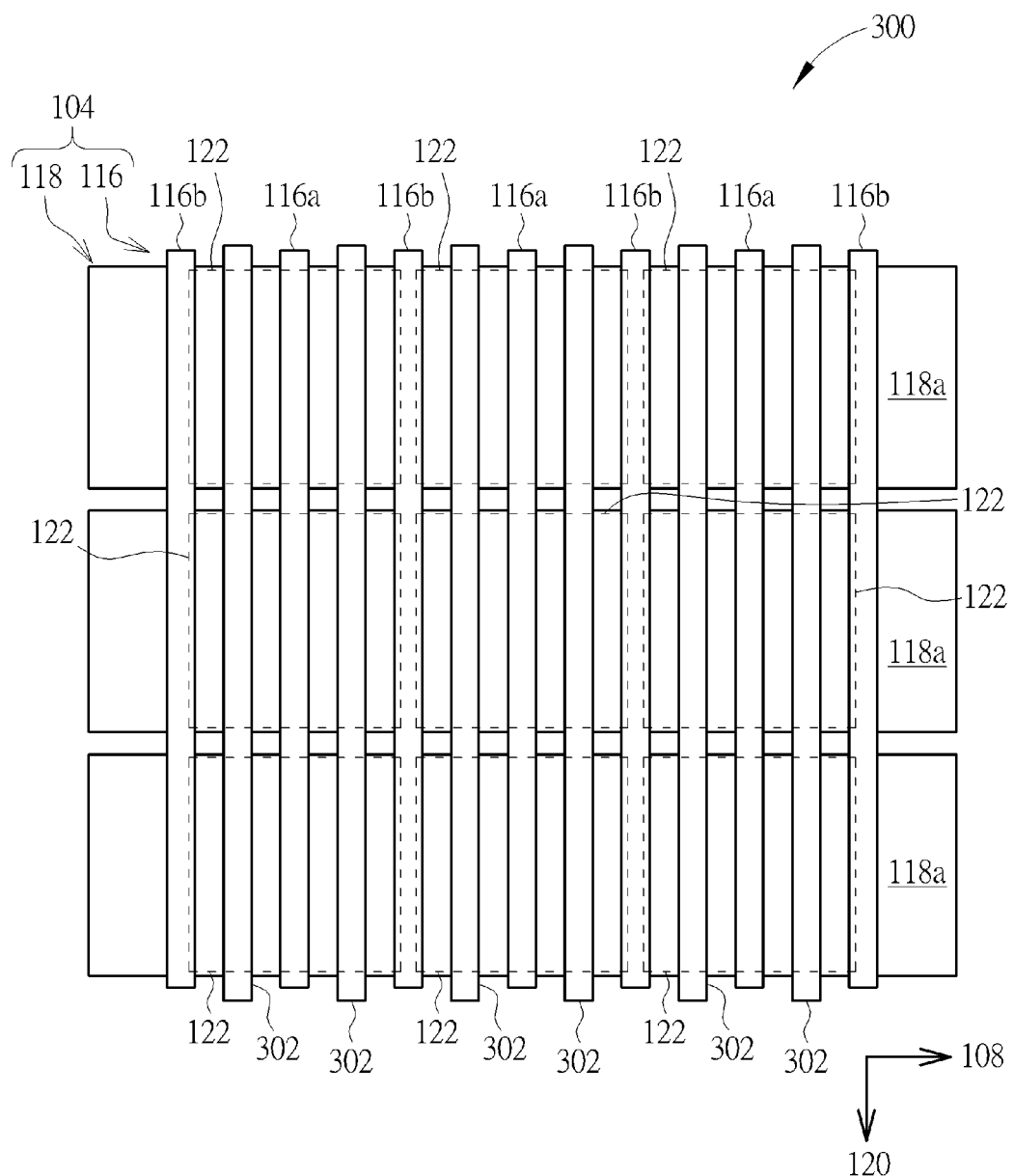
FIG. 11 is a cross-sectional schematic view illustrating a stereoscopic display device according to a third embodiment of the present invention.

Referring to FIG. 11, FIG. 11 is a schematic cross-sectional view illustrating a stereoscopic display device according to a third embodiment of the present invention. As shown in FIG. 11, the third embodiment of the present invention provides a stereoscopic display device 300. In comparison with the stereoscopic display device 100 of the aforementioned first embodiment, the first electrode pattern 116 of this embodiment further includes a plurality of fourth stripe-shaped electrodes 302, and each of the fourth stripe-shaped electrodes 302 is disposed between each of the first stripe-shaped electrodes 116a and each of the second stripe-shaped electrodes 116b. In other words, the lens in each lens region 122 is formed by the electric field between each of the third stripe-shaped electrodes 118a and each of the first stripe-shaped electrodes 116a, and any two of the fourth stripe-shaped electrodes 302 and any two of the second stripe-shaped electrodes 116b adjacent to each of the first stripe-shaped electrodes 116a. It is worth mentioning that, while the fourth stripe-shaped electrodes 302 cross through the lens region 122 corresponding to the 3D image, the fourth voltage provided to the fourth stripe-shaped electrodes 302 is between the first voltage and the second voltage, thus the lens can have a preferable cured surface.

Figure 12:
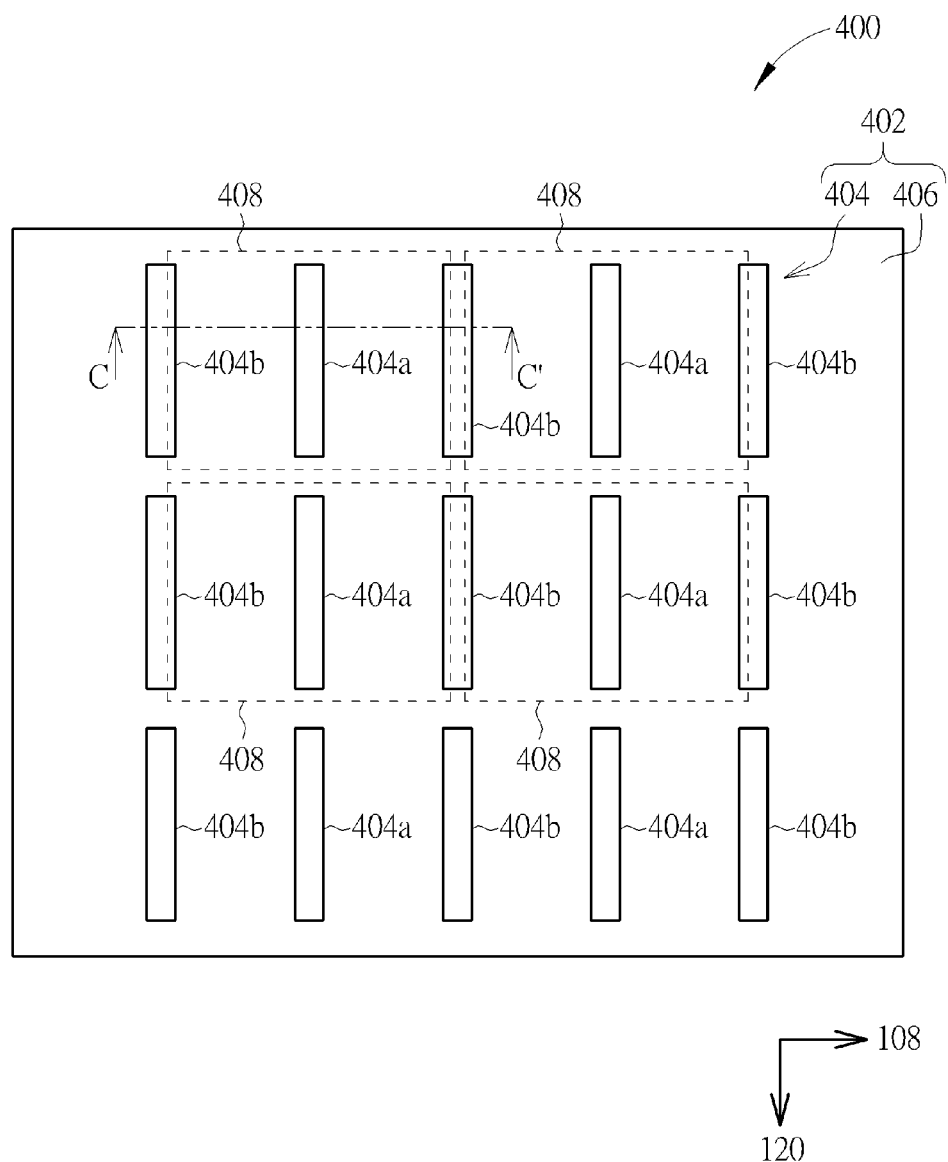
FIG. 12 is a schematic top view illustrating a stereoscopic display device according to a fourth embodiment of the present invention.
Figure 13:
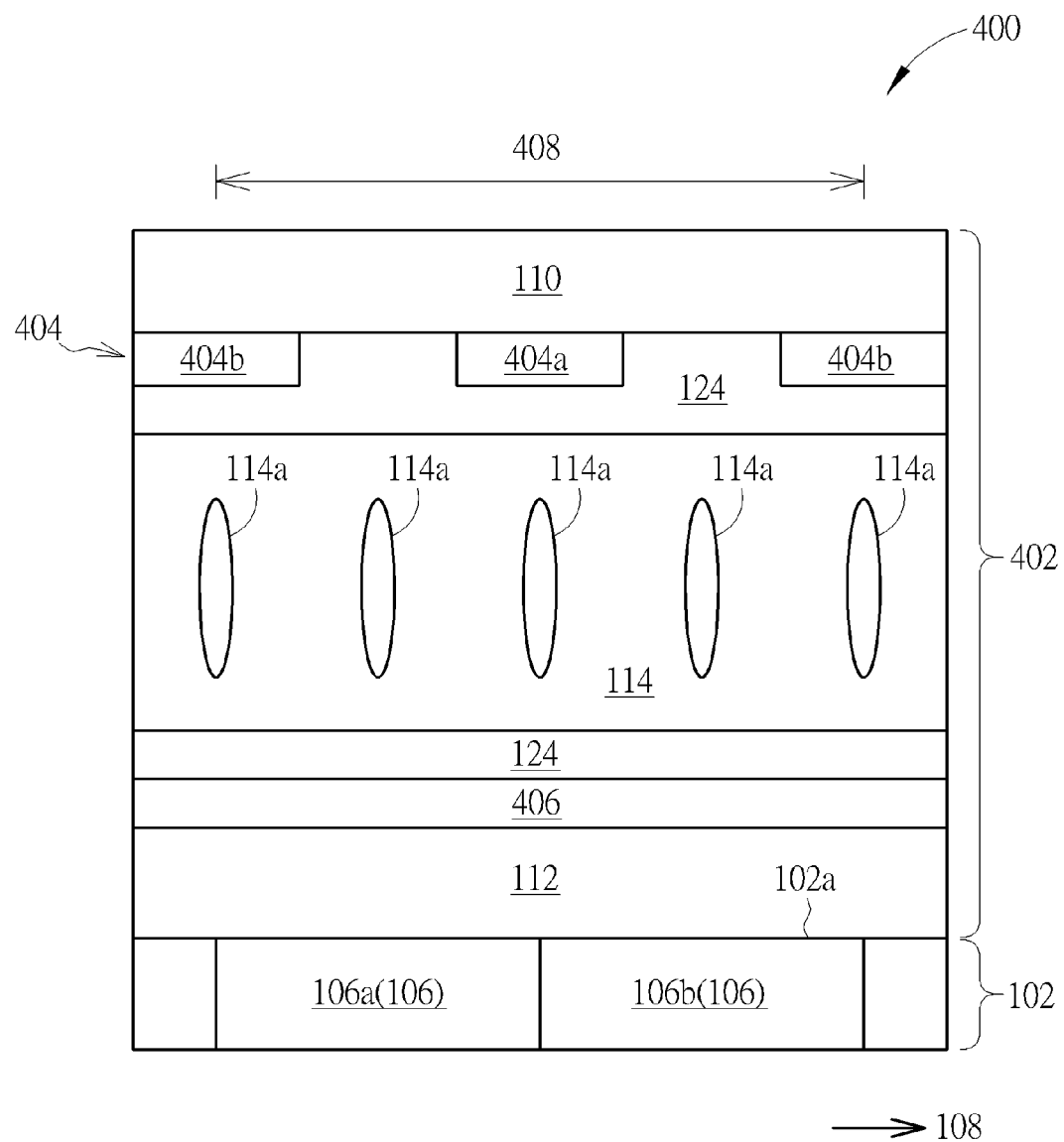
FIG. 13 is a cross-sectional schematic view taken along the cross line C-C' in FIG. 12.

Referring to FIG. 12 and FIG. 13, FIG. 12 is a schematic top view illustrating a stereoscopic display device according to a fourth embodiment of the present invention, and FIG. 13 is a schematic cross-sectional view taken along a cross line C-C' in FIG. 12. As shown in FIG. 12 and FIG. 13, the fourth embodiment of the present invention provides a stereoscopic display device 400. In comparison with the stereoscopic display device 100 of the aforementioned first embodiment, the electric layer disposed between the second substrate 112 and the liquid crystal layer 114 in the liquid crystal lens 402 is not patterned in this embodiment, and the lengths of the first stripe-shaped electrodes 404a and the second stripe-shaped electrodes 404b disposed between the first substrate 110 and the liquid crystal layer 114 in the second direction 120 are not identical to the length of each column of the pixels 106 in the second direction 120. Specially speaking, the liquid crystal lens 402 of this embodiment includes the first substrate 110, the second substrate 112, the liquid crystal layer 114, an electrode pattern 404 and a plane electrode 406. The first substrate 110, the second substrate 112 and the liquid crystal layer 114 can be the same as those in the aforementioned first embodiment, and will not be further detailed herein. The electrode pattern 404 is disposed between the first substrate 110 and the liquid crystal layer 114. The electrode pattern 404 includes a plurality of first stripe-shaped electrodes 404a and a plurality of the second stripe-shaped electrodes 404b, and the first stripe-shaped electrodes 404a and the second stripe-shaped electrodes 404b are arranged in a matrix arrangement, wherein each column of the second stripe-shaped electrodes 404b and each column of the first stripe-shaped electrodes 404a are arranged along the first direction 108 alternately. Please noted that, the length of the first stripe-shaped electrodes 404a along the second direction 120 is approximately identical to the length of each of the pixels 106 along the second direction 120, so that each row of the first stripe-shaped electrodes 404a and each row of the second stripe-shaped electrodes 404b are disposed corresponding to each row of the pixels 106. Therefore, any two of the second stripe-shaped electrodes 404b that are adjacent to each other define a lens region 408, and the liquid crystal lens 104 in each lens region 408 can present a single lens effect in the lens state. In other words, the lens in each lens region 408 is controlled through each of the first stripe-shaped electrodes 404a and two of the second stripe-shaped electrodes 404b that are adjacent to each other that are independently controlled. Also, while the frame includes the 3D image, each lens region 408 is disposed corresponding to each of the first viewing angle pixels 106a and each of the second viewing angle pixels 106b that are adjacent to each other. In addition, the plane electrode 406 is disposed between the second substrate 112 and the liquid crystal layer 114, and the plane electrode 406 covers the electrode pattern 404 in a projection direction perpendicular to the first substrate 110.

Figure 14:
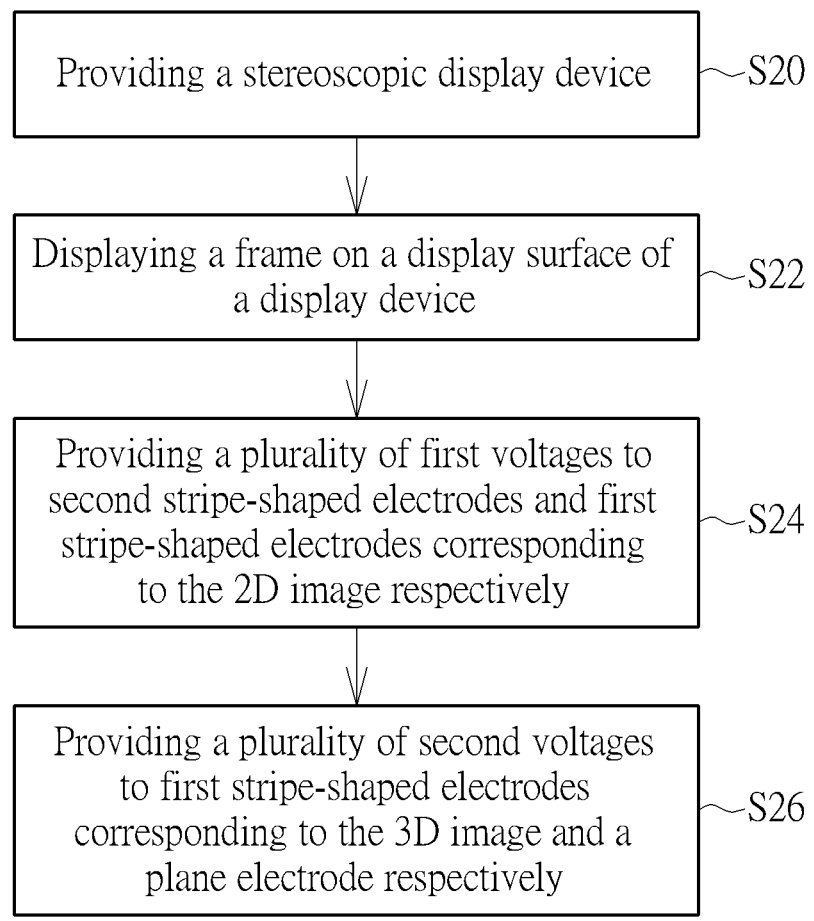
FIG. 14 is a flow chart illustrating a displaying method of the stereoscopic display device according to the fourth embodiment of the present invention, displaying a frame having the 2D image and the 3D image simultaneously.
Figure 15:
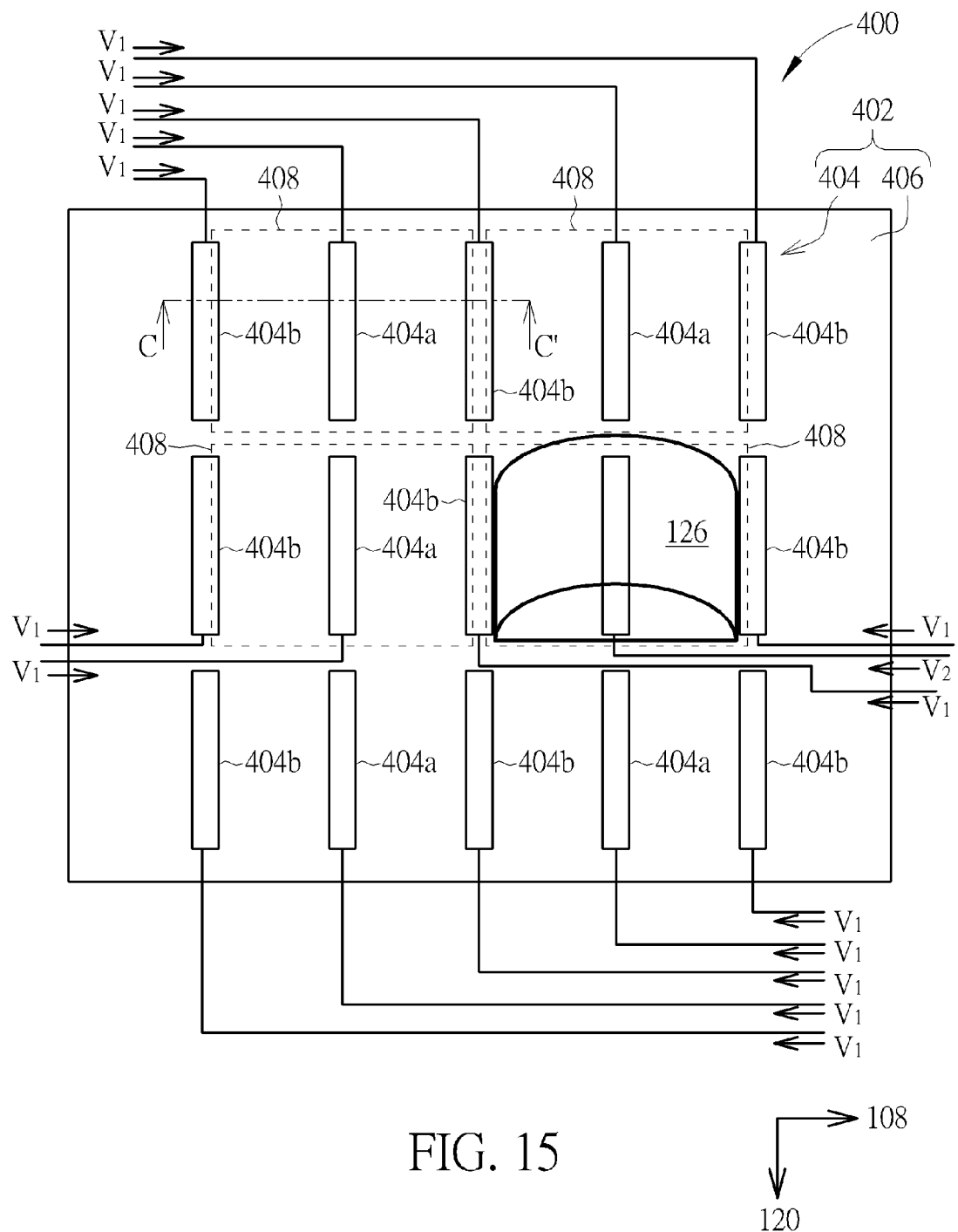
FIG. 15 is a diagram illustrating a liquid crystal lens according to the fourth embodiment of the present invention while the stereoscopic display device displaying a frame having the 2D image and the 3D image simultaneously.

In following description, a displaying method of the stereoscopic display device 400 of this embodiment for displaying the frame having the 2D image and 3D image simultaneously will be detailed. Referring to FIG. 14 and FIG. 15, FIG. 14 is a flow chart illustrating a displaying method of the stereoscopic display device according to the fourth embodiment of the present invention for displaying the frame having the 2D image and the 3D image simultaneously, and FIG. 15 is a diagram illustrating a liquid crystal lens according to the fourth embodiment of the present invention while the stereoscopic display device displaying the frame having the 2D image and the 3D image simultaneously. As shown in FIG. 14 and FIG. 15, the displaying method of the stereoscopic display device 400 for displaying the frame having the 2D image and the 3D image simultaneously of this embodiment may include:

Step S20: providing the stereoscopic display device 400;

Step S22: displaying a frame on the display surface 102a of the display device 102, and the frame including a 2D image and a 3D image;

Step S24: providing a plurality of first voltages $V_1$ to the second stripe-shaped electrodes 404b and the first stripe-shaped electrodes 404a corresponding to the 2D image respectively; and Step S26: providing a plurality of second voltages $V_2$ to the first stripe-shaped electrodes 404a corresponding to the 3D image and the plane electrode respectively.

Since step S20 to step S24 is the same as step S10 to step S14 of the aforementioned first embodiment, said steps will not be further detailed herein. In this embodiment, the first voltage difference between each of the first voltages $V_1$ and each of the second voltages $V_2$ can also be greater than 0 volts and less than 20 volts, so that the first voltage difference can be used to rotate the long axis of the liquid crystal molecules 114a to be approximately perpendicular to the first substrate 110. Also, each of the first voltages $V_1$ can be greater than each of the second voltages $V_2$, but not limited thereto. Precisely speaking, each of the first voltages $V_1$ can be a positive voltage, such as 2 volts, and each of the second voltages $V_2$ is 0 volts, but the present invention is not limited thereto. In other embodiments of the present invention, each of the first voltages can be less than each of the second voltages, but not limited thereto. Precisely, speaking, each of the first voltages can be a negative voltage, such as −3 volts, and each of the second voltages is 0 volts. Otherwise, each of the second voltages is not 0 volts but is a positive voltage or a negative voltage. Additionally, the first voltages of the present invention are identical to each other, and the second voltages of the present invention are identical to each other, but the present invention is not limited thereto. In other embodiment of the present invention, at least two of the first voltages can be not identical to each other, or at least two of the third voltages $V_3$ can also be not identical to each other.

Furthermore, since each lens region 408 of this embodiment corresponds to each of the first stripe-shaped electrodes 404a and any two of the second stripe-shaped electrodes 404b that are adjacent to each other separately, and the first voltage $V_1$ or the second voltages $V_2$ provided to each of the first stripe-shaped electrodes 404a and any two of the second stripe-shaped electrodes 404b that are adjacent to each other are also separately, so that the liquid crystal lens 402 in each lens region 408 can be controlled separately. In other words, while the lens regions 408 corresponds to the 3D image, the second voltages $V_2$ are provided to the first stripe-shaped electrodes 404a in the lens regions 408, thus that, there is no electric field between the first stripe-shaped electrodes 404a and the plane electrode 406 to drive the liquid crystal molecules 114a. Also, the first voltages $V_1$ are still provided to the second stripe-shaped electrodes 404b in the lens regions 408, so that the liquid crystal molecules 114a in the lens regions 408 will form the lenses. Since the driving method of the liquid crystal molecules 114a in the lens regions 408 corresponding to the 2D image is the same as that of the lens regions 122a in the first embodiment, and the driving method of the liquid crystal molecules 114a in the lens regions 408 corresponding to the 3D image is the same as that of the lens region 122d in the first embodiment, the same description will not be further detailed herein. In addition, the liquid crystal lens 402 of this embodiment can further include an active matrix transistor, which is adapted to provide the first voltages $V_1$ to the second stripe-shaped electrodes 404b respectively, and to provide the second voltages $V_2$ to the first stripe-shaped electrodes 404a respectively, but not limited thereto. In other embodiments of the present invention, the first stripe-shaped electrodes and second stripe-shaped electrodes of the liquid crystal lens can be electrically connected to separated voltage sources, respectively, so as to provide required voltages to the first stripe-shaped electrodes and second stripe-shaped electrodes respectively.

Figure 16:
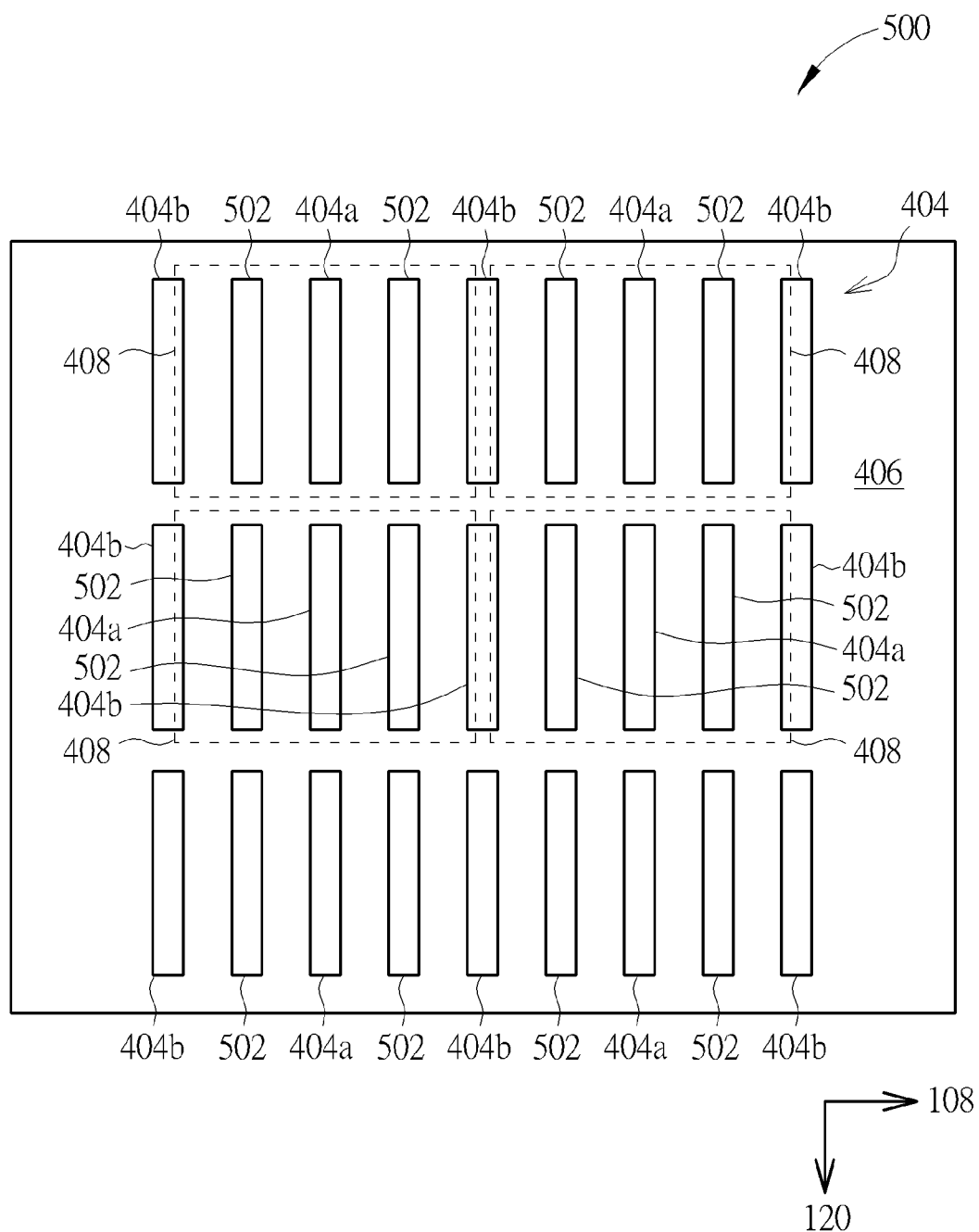
FIG. 16 is a cross-sectional schematic view illustrating a stereoscopic display device according to a fifth embodiment of the present invention.

Referring to FIG. 16, FIG. 16 is a cross-sectional schematic view illustrating a stereoscopic display device according to a fifth embodiment of the present invention. As shown in FIG. 16, the fifth embodiment of the present invention provides a stereoscopic display device 500. In comparison with the stereoscopic display device 400 of the aforementioned fourth embodiment, the electrode pattern 404 of this embodiment further includes a plurality of fourth stripe-shaped electrodes 502, and each of the fourth stripe-shaped electrodes 502 is disposed between each of the first stripe-shaped electrodes 404a and each of the second stripe-shaped electrodes 404b. In other words, the lens in each lens region 408 is formed by the electric field between each of the first stripe-shaped electrodes 404a, and any two of the fourth stripe-shaped electrodes 502 and any two of the second stripe-shaped electrodes 404b adjacent to each of the first stripe-shaped electrodes 404a. It is worth mentioning that, while the lens regions 408 corresponds to the 3D image, the fourth voltage provided to the fourth stripe-shaped electrodes 502 in each lens region 408 is between the first voltage $V_1$ and the second voltage $V_2$, thereby providing a preferable cured surface to the formed lens.

In summary, since the third stripe-shaped electrodes of the liquid crystal lens in the present invention are interlaced with the first stripe-shaped electrodes and the second stripe-shaped electrodes, and are disposed corresponding to each row of the pixels, the liquid crystal lens in a portion of the lens regions can be in the transparent state and the liquid crystal lens in another portion of the lens regions is in the lens state simultaneously. Furthermore, the liquid crystal lens of the present invention further use separately controlled first stripe-shaped electrodes and the second stripe-shaped electrodes to present the lens state in the lens regions corresponding to the 3D image, and to present the transparent state in the lens regions corresponding to the 2D image. Therefore, the stereoscopic display device of the present invention can display the 2D image and the 3D image simultaneously.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A displaying method of a stereoscopic display device, comprising:
    providing the stereoscopic display device, the stereoscopic display device comprising:
        a display device, comprising a display surface, and the display device comprising a plurality of pixels; and
        a liquid crystal lens, disposed on the display surface and the liquid crystal lens comprising:
            a first substrate;
            a second substrate, disposed opposite to the first substrate;
            a liquid crystal layer, disposed between the first substrate and the second substrate;
            a first electrode pattern, disposed between the first substrate and the liquid crystal layer, and the first electrode pattern comprising a plurality of first stripe-shaped electrodes and a plurality of second stripe-shaped electrodes, wherein each of the first stripe-shaped electrodes is disposed between any two of the second stripe-shaped electrodes that are adjacent to each other, and each of the second stripe-shaped electrodes and each of the first stripe-shaped electrodes are arranged along a first direction alternately; and
            a second electrode pattern, disposed between the second substrate and the liquid crystal layer, and the second electrode pattern comprising a plurality of third stripe-shaped electrodes sequentially arranged along a second direction different from the first direction and interlaced with the first stripe-shaped electrodes and the second stripe-shaped electrodes, wherein any two of the second stripe-shaped electrodes that are adjacent to each other and two opposite sides of each of the third stripe-shaped electrodes define a lens region;
    displaying a frame on the display surface of the display device, and the frame comprising a two-dimensional image and a three-dimensional image;
    providing a plurality of first voltages to the second stripe-shaped electrodes and the first stripe-shaped electrodes corresponding to the two-dimensional image respectively;
    providing a plurality of second voltages to the first stripe-shaped electrodes corresponding to the three-dimensional image and the third stripe-shaped electrodes corresponding to the three-dimensional image respectively; and
    providing a plurality of third voltages to the third stripe-shaped electrodes corresponding to the two-dimensional image, wherein each of the second voltages is between each of the first voltages and each of the third voltages.

2. The displaying method of the stereoscopic display device according to claim 1, wherein there is a first voltage difference between each of the first voltages and each of the second voltages, and the first voltage difference is greater than 0 volts and less than 20 volts.

3. The displaying method of the stereoscopic display device according to claim 1, wherein there is a second voltage difference between each of the third voltages and each of the second voltages, and the second voltage difference is greater than 0 volts and less than 20 volts.

4. The displaying method of the stereoscopic display device according to claim 1, wherein each of the first voltages is greater than each of the second voltages, and each of the second voltages is greater than each of the third voltages.

5. The displaying method of the stereoscopic display device according to claim 4, wherein each of the first voltages is a positive voltage, each of the second voltages is zero volts, and each of the third voltages is a negative voltage.

6. The displaying method of the stereoscopic display device according to claim 1, wherein each of the first voltages is less than each of the second voltages, and each of the second voltages is less than each of the third voltages.

7. The displaying method of the stereoscopic display device according to claim 6, wherein each of the first voltages is a negative voltage, each of the second voltages is zero volts, and each of the third voltages is a positive voltage.

* * * * *